(12) United States Patent
Centonza (10) Patent No.: US 8,934,913 B2
(45) Date of Patent: Jan. 13, 2015

(54) ENHANCED MOBILITY TO HOME BASE STATION CELLS

(75) Inventor: Angelo Centonza, Winchester (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 68 days.

(21) Appl. No.: 13/593,692

(22) Filed: Aug. 24, 2012

(65) Prior Publication Data

US 2013/0079021 A1 Mar. 28, 2013

Related U.S. Application Data

(60) Provisional application No. 61/540,245, filed on Sep. 28, 2011.

(51) Int. Cl.
*H04W 36/00* (2009.01)
*H04W 84/04* (2009.01)
*H04W 36/04* (2009.01)

(52) U.S. Cl.
CPC ........ *H04W 36/0055* (2013.01); *H04W 84/045* (2013.01); *H04W 36/04* (2013.01)
USPC ........ 455/444; 455/436; 455/433; 455/435.3; 455/448

(58) Field of Classification Search
CPC .... H04W 36/04; H04W 88/06; H04W 84/045
USPC ........................ 455/436, 444, 433, 435.3, 448
See application file for complete search history.

(56) References Cited

U.S. PATENT DOCUMENTS

| | | | |
|---|---|---|---|
| 2009/0070694 A1* | 3/2009 | Ore et al. ................. | 715/764 |
| 2009/0305699 A1* | 12/2009 | Deshpande et al. .......... | 455/434 |
| 2010/0048216 A1* | 2/2010 | Sundarraman et al. ........ | 455/444 |
| 2010/0112980 A1* | 5/2010 | Horn et al. .................... | 455/411 |
| 2010/0120438 A1* | 5/2010 | Kone et al. .................... | 455/444 |
| 2010/0210268 A1* | 8/2010 | Lim et al. ...................... | 455/436 |
| 2010/0238858 A1* | 9/2010 | Kim et al. ..................... | 370/328 |
| 2010/0278147 A1* | 11/2010 | Horn et al. .................... | 370/331 |

(Continued)

OTHER PUBLICATIONS

3rd Generation Partnership Project. 3GPP TR 37.803, V0.1.2 (Jun. 2011). 3rd Generation Partnership Project; Technical Specification Group RAN; UMTS and LTE; Mobility Enhancements for H(e)NB (Release 11). Jun. 2011.

3rd Generation Partnership Project. 3GPP TS 23.060, V10.4.0 (Jun. 2011). 3rd Generation Partnership Project; Technical Specification Group Services and System Aspects; General Packet Radio Service (GPRS); Service description; State 2 (Release 10). Jun. 2011.

(Continued)

*Primary Examiner* — Kashif Siddiqui
*Assistant Examiner* — Mong-Thuy Tran
(74) *Attorney, Agent, or Firm* — Murphy, Bilak & Homiller, PLLC (57) ABSTRACT

Cell relocation procedures to address handover between a macro radio network controller (RNC) and a home base station in a wireless communication network, while accounting for access control or membership verification procedures needed to support a Closed Subscriber Group (CSG) at the home base station. An example method begins with the receiving of a request for handover of the mobile terminal from an RNC of the macro wireless network. A closed subscriber group (CSG) identifier for the home base station and a cell access mode for the home base station are then sent, to a core network node associated with the macro wireless network, for use by the core network node in membership verification or access control for the mobile terminal. In response, the home base station receives a CSG membership status for the mobile terminal from the core network node.

13 Claims, 10 Drawing Sheets

(56) References Cited

U.S. PATENT DOCUMENTS

| | | | |
|---|---|---|---|
| 2010/0279687 A1* | 11/2010 | Horn et al. | 455/435.1 |
| 2010/0298005 A1* | 11/2010 | Yavuz et al. | 455/452.2 |
| 2011/0171915 A1* | 7/2011 | Gomes et al. | 455/73 |
| 2011/0189998 A1* | 8/2011 | Joo et al. | 455/444 |
| 2011/0218004 A1* | 9/2011 | Catovic et al. | 455/509 |
| 2011/0244870 A1* | 10/2011 | Lee | 455/444 |
| 2012/0002637 A1* | 1/2012 | Adjakple et al. | 370/331 |
| 2012/0021743 A1* | 1/2012 | Filipovic et al. | 455/435.1 |
| 2012/0100852 A1* | 4/2012 | Horn | 455/436 |
| 2012/0149362 A1* | 6/2012 | Tooher et al. | 455/423 |
| 2012/0238268 A1* | 9/2012 | Radulescu et al. | 455/435.1 |
| 2012/0309394 A1* | 12/2012 | Radulescu et al. | 455/436 |

OTHER PUBLICATIONS

3rd Generation Partnership Project. 3GPP TS 25.413, V10.2.0 (Jun. 2011). 3rd Generation Partnership Project; Technical Specification Group Radio Access Network; UTRAN Iu interface Radio Access Network Application Part (RANAP) signalling (Release 10). Jun. 2011.

3rd Generation Partnership Project. 3GPP TS 25.467, V10.2.0 (Jun. 2011). 3rd Generation Partnership Project; Technical Specification Group Radio Access Network; UTRAN architecture for 3G Home Node B (HNB); Stage 2 (Release 10). Jun. 2011.

3rd Generation Partnership Project. "Proposed DIS: Further Enhancements for HNB and HeNB." TSG RAN meeting #51, RP-110456, Kansas City, USA, Mar. 15-18, 2011.

* cited by examiner

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Old Iu Signalling Connection Identifier | M | | Iu Signalling Connection Identifier 9.2.1.38 | | YES | reject |
| Iu Signalling Connection Identifier | M | | 9.2.1.38 | | YES | reject |
| Relocation Source RNC-ID | M | | Global RNC-ID 9.2.1.39 | If the Relocation Source Extended RNC-ID IE is included in the message, the Global RNC-ID IE in the Relocation Source RNC-ID IE shall be ignored. | YES | reject |
| Relocation Source Extended RNC-ID | O | | Global RNC-ID 9.2.1.39 | The Relocation Source Extended RNC-ID IE shall be used if the RNC identity has a value larger than 4095. | YES | reject |
| Relocation Target RNC-ID | M | | Global RNC-ID 9.2.1.39 | If the Relocation Target Extended RNC-ID IE is included in the message, the RNC-ID IE in the Target RNC-ID IE shall be ignored. | YES | reject |

*FIG. 6A*

| IE/Group Name | Presence | Range | IE type and reference | Semanatics description | Criticality | Assigned Criticality |
|---|---|---|---|---|---|---|
| Relocation Target Extended RNC-ID | O | | 9.2.1.39a | The Relocation Target Extended RNC-ID IE shall be used if the RNC identity has a value larger than 4095. | YES | reject |
| RABs Setup List | O | | | | YES | reject |
| >RABs Setup Item IEs | | 1 to <maxnoofRABs> | | | EACH | reject |
| >>RAB ID | M | | 9.2.1.2 | | -- | |
| >>Transport Layer Address | O | | 9.2.2.1 | IPv6 or IPv4 address | -- | |
| >>Iu Transport Association | O | | 9.2.2.2 | Related to TLA above | -- | |
| >>Assigned RAB Parameter Values | O | | 9.2.1.44 | | | |
| Chosen Integrity Protection Algorithm | O | | 9.2.1.13 | Indicates the Integrity Protection algorithm that will be used by the target RNC. | YES | ignore |
| Chosen Encryption Algorithm | O | | 9.2.1.14 | Indicates the Encryption algorithm that will be used by the target RNC. | YES | ignore |
| CSG id | O | | 9.2.1.85 | | YES | reject |
| Cell Access Mode | O | | 9.2.1.93 | | YES | reject |

FIG. 6B

| IE/Group Name | Presence | Range | IE type and reference | Semanatics description | Criticality | Assigned Criticality |
|---|---|---|---|---|---|---|
| Message Type | M | | 9.2.1.1 | | YES | ignore |
| RABs Setup List | O | | | | YES | ignore |
| >RABs Setup Item IEs | | 1 to <maxnoofRABs> | | | EACH | reject |
| >>RAB ID | M | | 9.2.1.2 | | -- | |
| >>RAB Parameters | O | | 9.2.1.3 | | -- | |
| >>User Plane Information | M | | | | -- | |
| >>>User Plane Mode | M | | 9.2.1.18 | | -- | |
| >>>UP Mode Versions | M | | 9.2.1.19 | | -- | |
| >>Transport Layer Address | O | | 9.2.2.1 | | -- | |
| >>Iu Transport Association | O | | 9.2.2.2 | Related to TLA above | -- | |
| >>Offload RAB parameters | O | | 9.2.1.94 | Applicable only for SIPTO at Iu-PS | YES | ignore |
| RABs To Be Released List | O | | | | YES | ignore |
| >RABs To Be Released Item | | 1 to <maxnoofRABs> | | | EACH | ignore |
| >>RAB ID | M | | 9.2.1.2 | | -- | |
| >>Cause | M | | 9.2.1.4 | | -- | |
| Criticality Diagnostics | O | | 9.2.1.35 | | YES | ignore |
| UE Aggregate Maximum Bit Rate | O | | 9.2.1.91 | | YES | ignore |
| MSISDN | O | | 9.2.1.95 | Applicable only for SIPTO at Iu-PS | YES | ignore |
| CSG Membership Status | O | | 9.2.1.92 | | YES | ignore |

ENHANCED MOBILITY TO HOME BASE STATION CELLS

RELATED APPLICATION

This application claims the benefit of and priority to U.S. Provisional Application Ser. No. 61/540,245, filed 28 Sep. 2011. The entire contents of said U.S. Provisional application are incorporated herein by reference.

TECHNICAL FIELD

The present invention relates to heterogeneous networks, and more particularly relates to methods and apparatus for handing over mobile terminals from a Radio Network Controller in a macro wireless network to a home base station supporting a closed subscriber group.

BACKGROUND

The 3rd-Generation Partnership Project (3GPP) is continuing development of specifications for the Universal Terrestrial Radio Access Network (UTRAN). That continuing development includes improved support for heterogeneous networks. In heterogeneous networks (also known as Het-Nets), an existing homogeneous network, e.g., a cellular network comprising several similarly-sized macro cells, is overlaid with additional lower-power cells, such as femtocells, which can be referred to as Home Node B's or HNBs. These femtocells may be configured as home base stations to support connectivity for only a limited set of subscribers, known as a Closed Subscriber Group (CSG).

HNBs may operate in open, closed, or hybrid access modes. In open access mode, the HNB appears as a normal base station to mobile terminals (UEs, in 3GPP terminology), and can freely provide services to non-member mobile terminals. In closed access mode, the HNB only provides services to members of its CSG. In the hybrid access mode, the HNB provides services to both its members and also to non-members, but prioritizes members over non-members.

The Wideband Code Division Multiple Access (WCDMA) HNB architecture has been developing at a very high rate in the last few years. One of the developments concerns improving mobility procedures for UEs moving between HNBs as well as for UEs moving between HNBs and macro cells. Some examples of mobility that are currently supported include the following:

Hard handover (HHO) mobility, based on Radio Access Network Application Part (RANAP) signaling. Hard handovers can be carried out between any type or source or target, including, for example, a source macro Radio Network Controller (RNC) and a target HNB with any sort of cell access mode (closed, hybrid or open). This type of mobility follows procedures specified in the 3GPP standards document entitled "UTRAN Iu interface; Radio Access Network Application Part (RANAP) signaling", 3GPP TS 25.413, v. 10.2.0 (June 2011), and is based on the principle that access control and member verification processes, which determine whether a mobile terminal should be permitted to enter a closed mode cell or whether a mobile terminal should be prioritized within a hybrid mode cell, are carried out in the core network.

HNB-to-HNB hard handover via the "Iurh" interface, as described in section 5.7 of "UTRAN Architecture for 3G Home Node B (HNB); Stage 2," 3GPP TS 25.467, v. 10.2.0 (June 2011). This type of mobility is possible between HNBs only and can occur between open access HNBs or between hybrid access HNBs with the same CSG, or between closed access HNBs with the same CSG. This type of mobility occurs without any involvement of the core network, i.e., mobility signaling is handled within the HNB gateway domain without ever exiting such domain.

HNB-to-HNB soft handover via the "Iurh" interface, as per section 5.7.3 of 3GPP TS 25.467, v. 10.2.0. This type of mobility is possible in the same scenarios as for the HNB-to-HNB hard handovers discussed above, with the difference being that mobility happens in a "soft" manner, such that the UE always maintains at least one radio link with the core network, unlike a hard handover, in which old radio links in the UE are removed.

The 3GPP has recently prioritized a number of mobility scenarios where enhanced mobility procedures are desired. Notably, the only mechanism currently existing to allow mobility between macro RNCs and HNBs is to use the RANAP-based hard handover mobility procedures, as described above, which are carried out via the core network. In these procedures, access control (performed for handover to closed access CSG cells) and membership verification (performed for handover to hybrid CSG cells) are carried out in a centralized manner by the core network, which holds subscriber information. However, this type of mobility is not efficient in terms of performance, due to the fact that every mobility signaling is routed via the CN, generating large delays.

SUMMARY

Existing cell relocation procedures are modified to address handover between a macro radio network controller (RNC) and a home base station in a wireless communication network, while accounting for access control or membership verification procedures needed to support a Closed Subscriber Group (CSG) at the home base station.

Several methods for performing a handover between an RNC in a macro wireless network and a home base station supporting a CSG in a wireless communication network, as carried out by the home base station, are disclosed. An example method begins with the receiving of a request for handover of the mobile terminal from an RNC of the macro wireless network. A closed subscriber group (CSG) identifier for the home base station and a cell access mode for the home base station are then sent, to a core network node associated with the macro wireless network, for use by the core network node in membership verification or access control for the mobile terminal. In response, the home base station receives a CSG membership status for the mobile terminal from the core network node.

In some embodiments, the home base station is operating in hybrid access mode and the method further includes a determination by the home base station, based upon the CSG membership status received from the core network node, of whether or not to prioritize the mobile terminal in the CSG. In some of these embodiments, the home base station may temporarily admit the mobile terminal to the CSG, prior to receiving the CSG membership status for the mobile terminal from the core network node, based on a reported CSG membership status for the mobile terminal received in the request for handover. In some cases, the reported CSG membership status indicates that the mobile terminal is a member of the CSG but the CSG membership status received from the core network node indicates that the mobile terminal is not a member of the CSG, in which the method may further include de-prioritizing the mobile terminal's access to the home base station in response to receiving the CSG membership status from the core network node.

In other embodiments, the home base station is operating in closed access mode, in which case the method may further include, based upon the CSG membership status received from the core network node, whether or not to admit the mobile terminal to the CSG. In some cases, the home base station may temporarily admit the mobile terminal to the CSG, prior to receiving the CSG membership status for the mobile terminal from the core network node, based on a reported CSG membership status for the mobile terminal received in the request for handover, but then disconnect the mobile terminal from the home base station upon determining that the CSG membership status received from the core network indicates that the mobile terminal is not a member of the CSG.

In some embodiments, the request for handover received from the radio network controller and the CSG membership status received from the core network node are received at the home base station via a home base station gateway. In these embodiments, the closed subscriber group (CSG) identifier and the cell access mode are likewise sent to the core network node via the home base station gateway. In some cases, the home base station is a Home NodeB connected to a Universal Terrestrial Radio Access Network (UTRAN), and the request for handover is a Radio Network Subsystem Application Part (RNSAP) Enhanced Relocation Request. In some of these embodiments, the CSG ID and the cell access mode are sent to the core network node via a Radio Access Network Application Part (RANAP) Enhanced Relocation Complete Request message and the CSG membership status is received via a RANAP Enhanced Relocation Complete Response message.

Other embodiments of the invention include home base station apparatus detailed herein. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
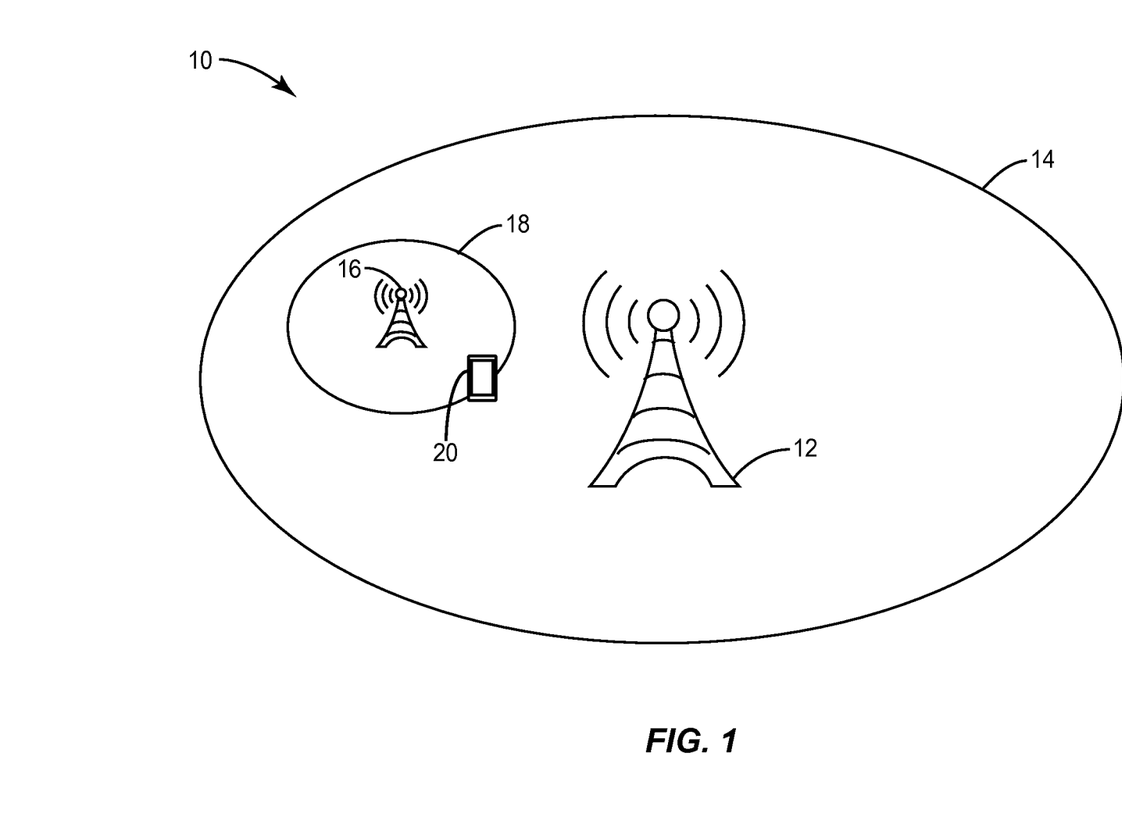
FIG. 1 illustrates an example heterogeneous wireless communication network.

FIG. 1 illustrates an example heterogeneous network 10 including a macro base station (MBS) 12 and a home base station (e.g., a HNB) 16. The macro base station 12 supports a macro cell coverage area 14. The HBS 16 supports a CSG within a smaller coverage area 18 that itself is at least partially within the macro cell coverage area 14.

Figure 2:
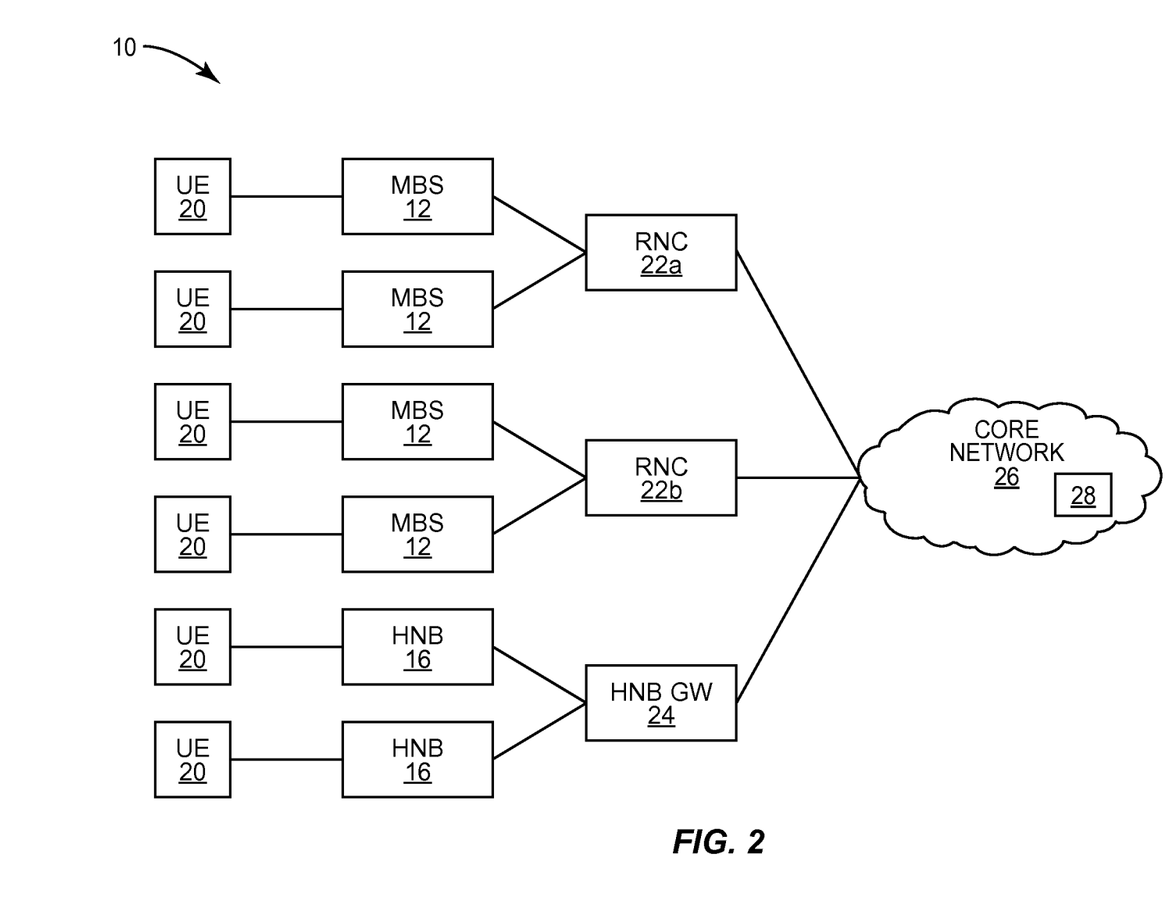
FIG. 2 illustrates additional details of the example heterogeneous wireless communication network.
Figure 3:
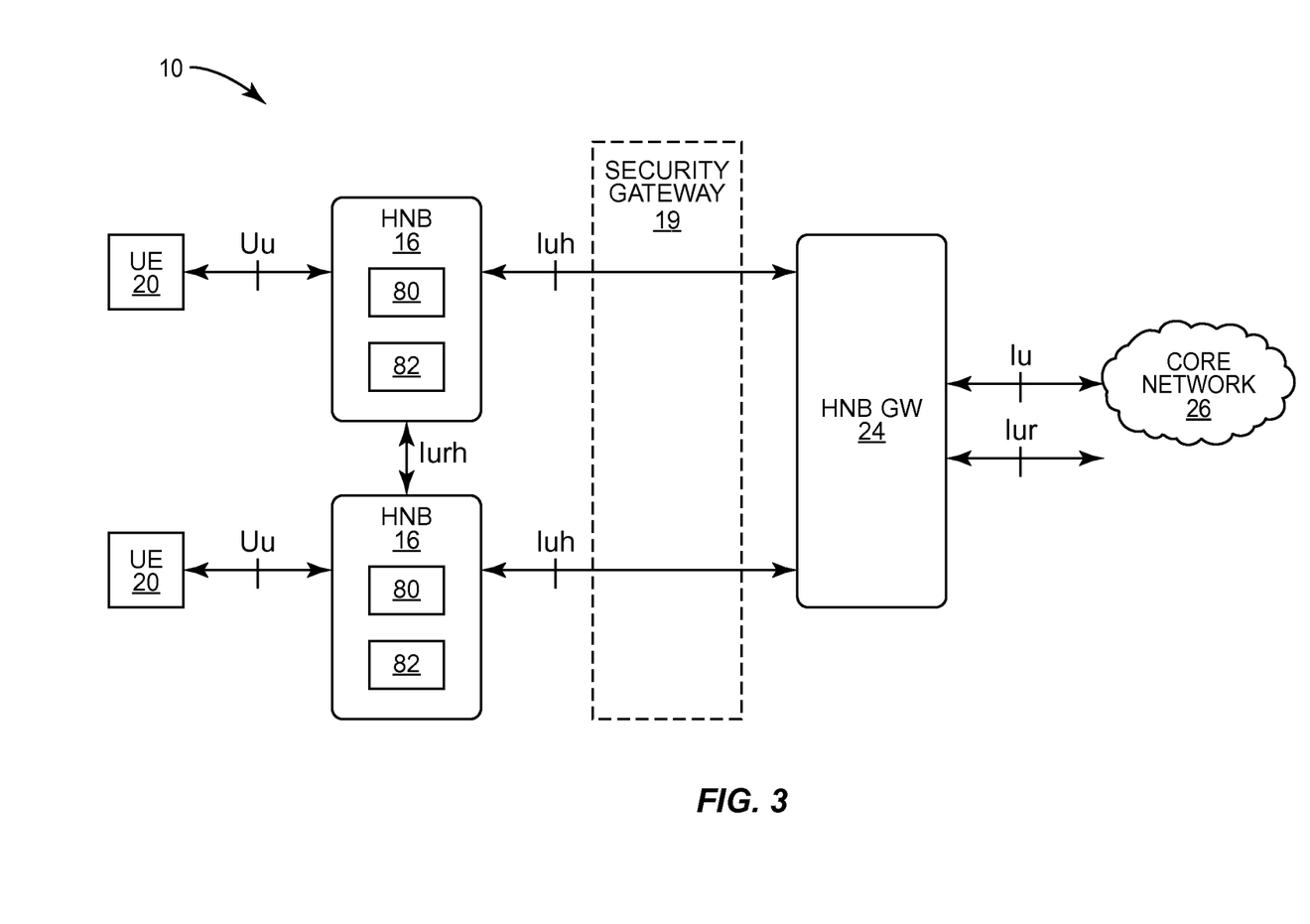
FIG. 3 illustrates still further details of the example heterogeneous wireless communication network.

FIGS. 2 and 3 illustrate additional details of the example heterogeneous wireless communication network 10. Referring to FIG. 2, the network 10 includes a plurality of MBSs 12, and a plurality of HNBs 16. RNCs 22a, 22b each control a plurality of MBSs 12. Likewise, a HNB gateway (HNB GW) 24 controls a plurality of HNBs 16. The RNCs 22a, 22b and HNB GW 24 are operative to communicate via core network (CN) 26.

Referring to FIG. 3, the mobile terminals (e.g. UEs) 20 can communicate wirelessly with their respective HNB 16 via a "Uu" interface of the HNB. Also, the HNBs 16 can communicate with each other via an "Iurh" interface, and can communicate with the HNB GW 24 via an "Iuh" interface. The HNB GW 24 relays communications between the HNBs 16 and the core network 26 via an "Iu" interface, and to other HNB GWs via an "Iur" interface. The security gateway 19 performs encryption/decryption, and may be implemented either as a separate physical element, or may be integrated into, for example, the HNB GW 24.

As discussed above, HNBs may operate in open, closed, or hybrid access modes. These access modes have been referred to in standardization efforts as both "cell access modes" and "CSG access modes"; while these terms should be understood to be equivalent, the term "cell access modes" is used herein. In open access mode, the HNB appears as a normal base station to mobile terminals (UEs, in 3GPP terminology), and can freely provide services to non-member mobile terminals. In closed access mode, the HNB only provides services to members of its CSG. In the hybrid access mode, the HNB provides services to both its members and also to non-members, but prioritizes members over non-members.

As discussed above, the only mechanism currently existing to allow mobility between macro RNCs and HNBs is to use the RANAP-based hard handover mobility procedures, as described above, which are carried out via the core network. In these procedures, access control (performed for handover to closed access CSG cells) and membership verification (performed for handover to hybrid CSG cells) are carried out in a centralized manner by the core network, which holds subscriber information. However, this type of mobility is not efficient in terms of performance, due to the fact that all mobility signaling is routed via the core network, generating large delays.

Notably, however, the 3GPP has standardized an alternative way to carry out HHO mobility between RNCs. This enhanced procedure is known as "Enhanced Serving Radio Network Subsystem (SRNS) Relocation," and is carried out via RNSAP signaling over the "Iur" interface between the two RNCs involved in the mobility. This type of mobility is described in the 3GPP document "General Packet Radio Service (GPRS); Service description Stage 2 (Release 10)", 3GPP TS 23.060, v.10.4.0 (2011-06), and is illustrated as procedure 100 in the call flow diagram of FIG. 4. This type of mobility improves signaling performance in that the RNSAP messages are routed via the peer-to-peer "Iur" interface between RNCs, and do not need to pass through the core network 26.

Figure 4:
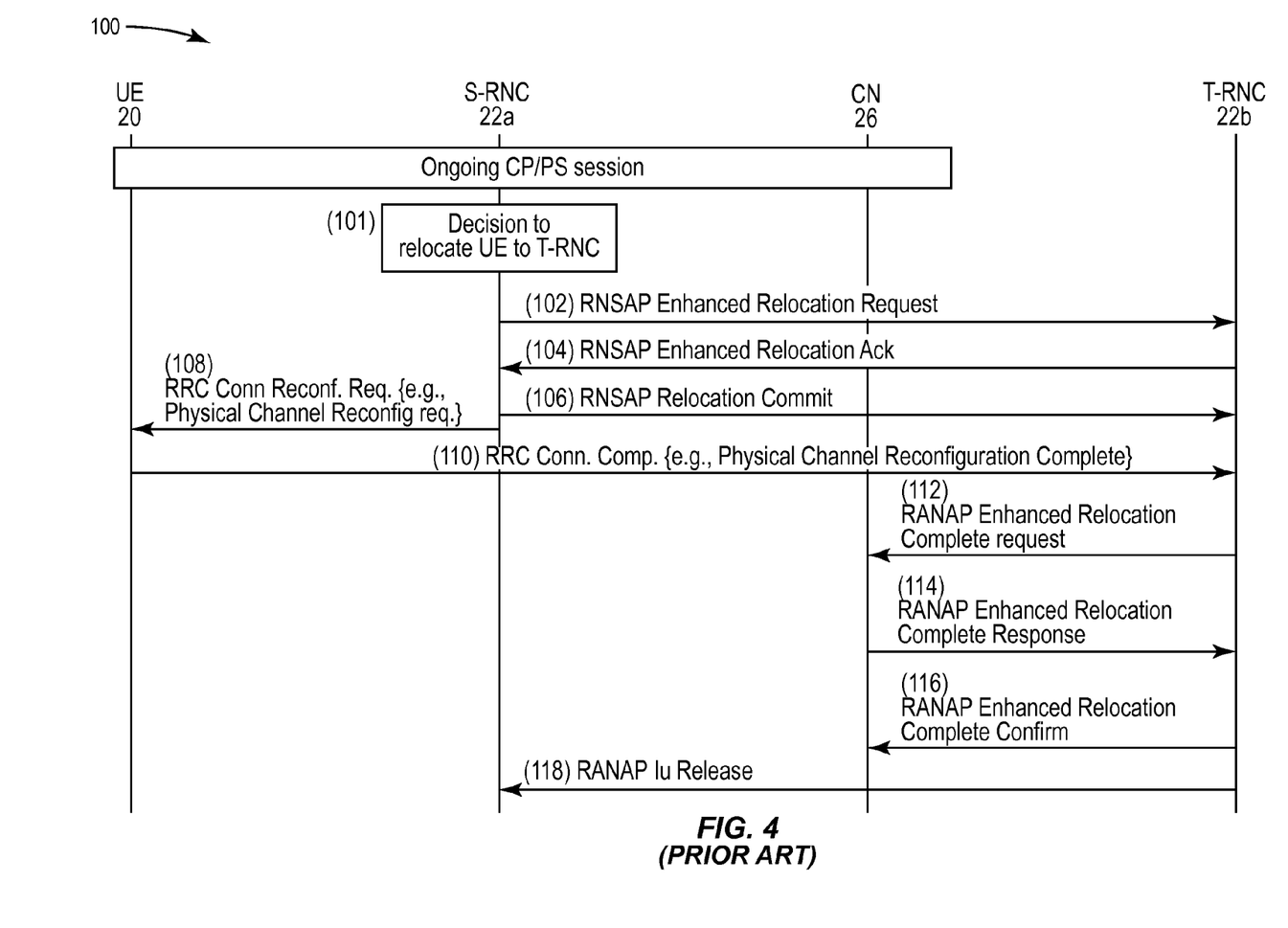
FIG. 4 illustrates a call flow diagram for a prior art Enhanced Serving Radio Network Subsystem (SRNS) handover procedure for handover between two RNCs.

Referring to FIG. 4, the illustrated Enhanced SRNS Relocation procedure 100 demonstrates the implementation of HHO between a serving macro RNC 22a and a target macro RNC 22b. As shown at step 101, a decision is made to relocate the UE 20 in question from the serving RNC 22a to the target RNC 22b. A RNSAP Enhanced Relocation Request is transmitted from the RNC 22a and is acknowledged by the RNC 22b, as shown at step 102 and 104. The serving RNC 22a then transmits a RNSAP Relocation Commit message, as shown at step 106. Notably, steps 102-106 are conducted via the "Iur" interface between the RNCs 22a-b.

RNC 22a transmits a Radio Resource Control (RRC) Conn. Reconfiguration Request message to the UE 20 and the UE 20 transmits a message to the target RNC 22b confirmation completion of the reconfiguration, as shown at steps 108 and 110. As seen at steps 112 and 114, the target RNC 22b then transmits a message to the CN 26 to complete the request completion of the relocation and the CN 26 transmits a complete response to the target RNC 22b. The target RNC 22b then confirms the relocation, as shown at step 116, and transmits a RANAP "Iu" release message to the serving RNC 22a, as shown at step 118.

Because the Enhanced SRNS Relocation procedure shown in FIG. 4 is only carried out between macro cells that are accessible by any UE (see, e.g., macro cell 14, in FIG. 1), there has never been any performance of access control or membership verification in this type of mobility. Thus, it is not possible in the existing Enhanced SRNS Relocation procedure 100 to carry out access control or membership verification for a UE moving to a CSG cell.

The Enhanced SRNS Relocation procedure 100 also lacks some features of the RANAP-based hard-handover mobility discussed earlier. For example, in the RANAP-based HHO mobility procedures, the results of the access control or membership verification processes are passed to the target HNB via a "RANAP Relocation Request," in the form of a "CSG Membership Status" information element (IE). This CSG Membership Status IE is set to "member" or "non-member" (see 3GPP TS 25.413 V10.2.0).

In the event the UE membership to the target CSG happened to change while the UE is connected to that cell, the current specifications for RANAP-based HHO mobility allow a "RANAP Common ID" message to be sent from the CN 26 to the HNB; this RANAP Common ID message can include the "CSG Membership Status" IE. Upon receipt of this IE, the target HNB can update the UE membership status and treat the UE accordingly. For example, the target HNB can disconnect the UE if it is no longer permitted to be connected to the cell, or de-prioritize the UE in a hybrid access mode cell if the UE is no longer a member of the CSG. However, in the Enhanced SRNS Relocation procedure 100 there are no mechanisms to pass the results of access control or membership verification from CN to target HNB.

Additionally, the RANAP-based HHO mobility procedures include a mechanism to carry out CSG ID validation. CSG ID validation is a process according to which the CSG ID reported by the UE as part of the mobility measurement report is checked at the target HNB. If the CSG ID reported by the UE is the same as the CSG ID broadcast by the target HNB, then the validation passes. If the validation fails, the target HNB has the option of either failing the mobility procedure (if the HNB operates as a closed CSG cell) or successfully completing the mobility procedure (if the HNB operates as a hybrid CSG cell).

If the validation fails it means that the CN received an incorrect CSG ID in the "RANAP Relocation Required" message. In this case, if the mobility procedure is successfully concluded, the target HNB reports its own CSG ID to the CN 26, in order to allow the CN 26 to charge the subscriber according to the correct CSG ID accessed. The current 3GPP specifications allow for a target HNB to report its own CSG ID in the "RANAP Relocation Request Acknowledge" message, hence allowing the CN to apply the correct charging for the subscriber. However, in the Enhanced SRNS Relocation procedure 100, reporting of the target CSG ID to the CN 26 is not supported.

Figure 5:
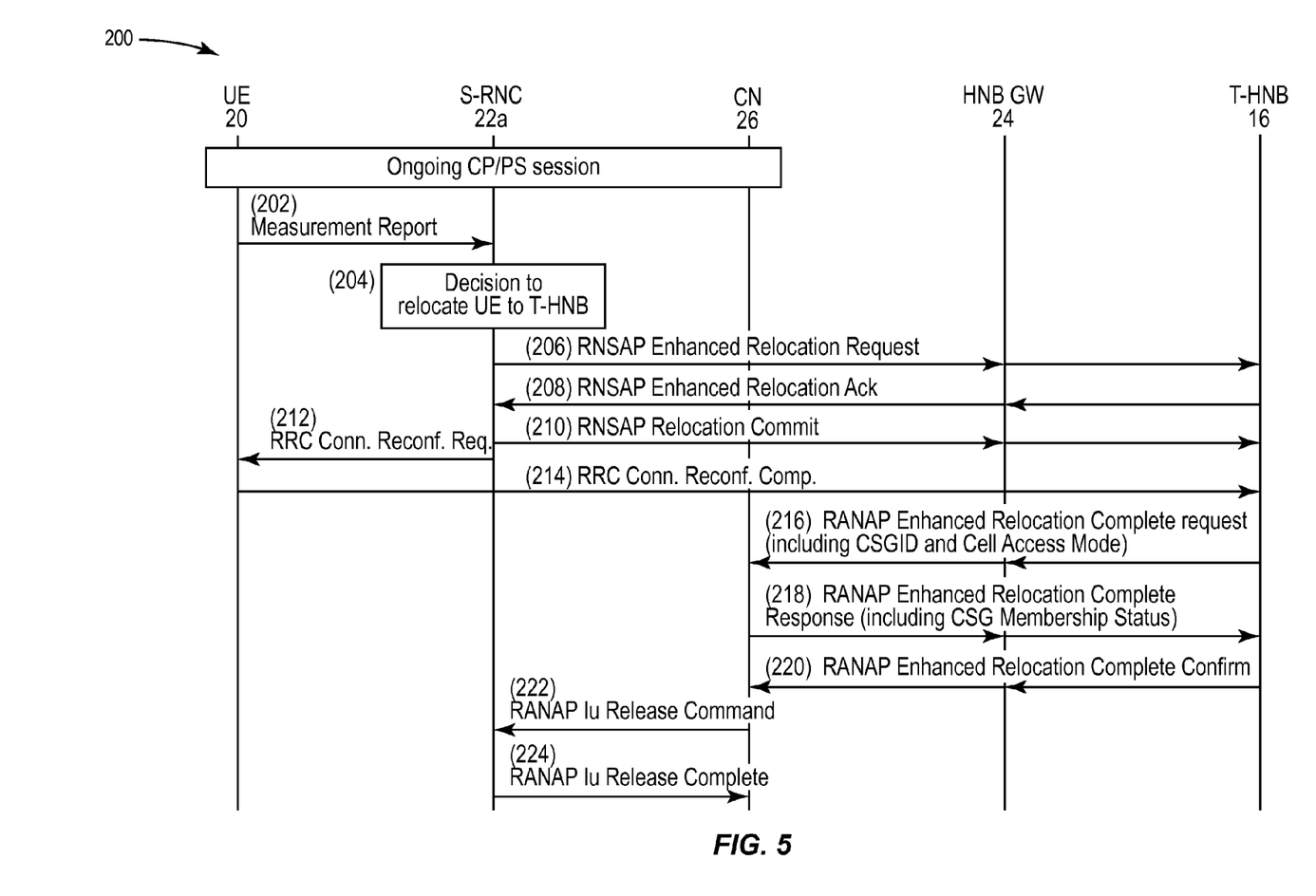
FIG. 5 is a call flow diagram for a modified enhanced SRNS handover procedure, for handover between a RNC and a HNB.

Several embodiments of the present invention address one or several of these shortcomings of existing procedures through modifications of the existing Enhanced SRNS Relocation procedures. Thus, FIG. 5 illustrates a procedure 200 in which the Enhanced SRNS Relocation procedure 100 is modified to support HHO mobility between a macro RNC 22 and closed or hybrid HNBs 16, and to address several of the problems discussed above. These enhancements include sending information to the CN 26 about the target CSG cell the UE 20 is accessing via mobility. This permits the CN 26 to carry out Access Control or Membership Verification, and further facilitates the correct charging in the event of CSG ID validation failure at the target. In some embodiments, these enhancements also include allowing the network to reply to the target HNB with the CSG Membership Status of the cell the UE is trying to access.

Referring to FIG. 5, the illustrated procedure 200 is conducted between a serving macro RNC 22a and a target HNB 16. A UE 20 transmits a measurement report to its serving RNC 22a, as shown at step 202. This measurement report includes an indication of whether the UE is part of the CSG of the target HNB 16. As shown at step 204, the serving RNC 22a makes a decision whether to relocate the UNC to the target HNB 16 or not.

As shown at step 206, a RNSAP Enhanced Relocation Request message is transmitted from the RNC 22a to the target HNB 16 via the HNB GW 24. In response, the target HNB 16 transmits an acknowledgement message back to the serving RNC 22a via the HNB GW 24, as shown at step 208. Upon receiving the acknowledgement, the serving RNC 22a transmits a RNSAP Relocation Commit message to the target HNB 16, as shown at step 210. Note that steps 206-210 collectively correspond to a "relocation preparation" phase. In one example, in steps 206-210 the HNB GW 24 communicates with the RNC 22a via the "Iur" interface that is traditionally used only by RNCs. Advantageously, such use of the "Iur" interface, and the appearance of the HNB GW 24 as a RNC to the CN 26, enables backwards compatibility with existing RNCs.

If the UE 20 has earlier reported its Membership Status in the Measurement Report (step 202), then the "CSG Membership Status" IE included in the "RANAP Enhanced Relocation Information Request" IE carried by the Enhanced Relocation Request of step 206 should be the same as what was reported by the UE 20. If no CSG Membership Status was reported by the UE 20 in the Measurement Report, then the CSG Membership Status included in the Enhanced Relocation Request (206) should be set to "non-member," in order to avoid incorrect prioritization by the target HNB 16.

In an "execution phase" that follows the "relocation preparation" phase, the macro RNC 22a transmits a Radio Resource Control (RRC) Conn. Reconfiguration Request message to the UE 20, as shown at step 212. In response, as shown at step 214, the UE 20 transmits a message to the T-HNB 16, via macro RNC 22a, confirming completion of the reconfiguration for handover.

Figure 6A:
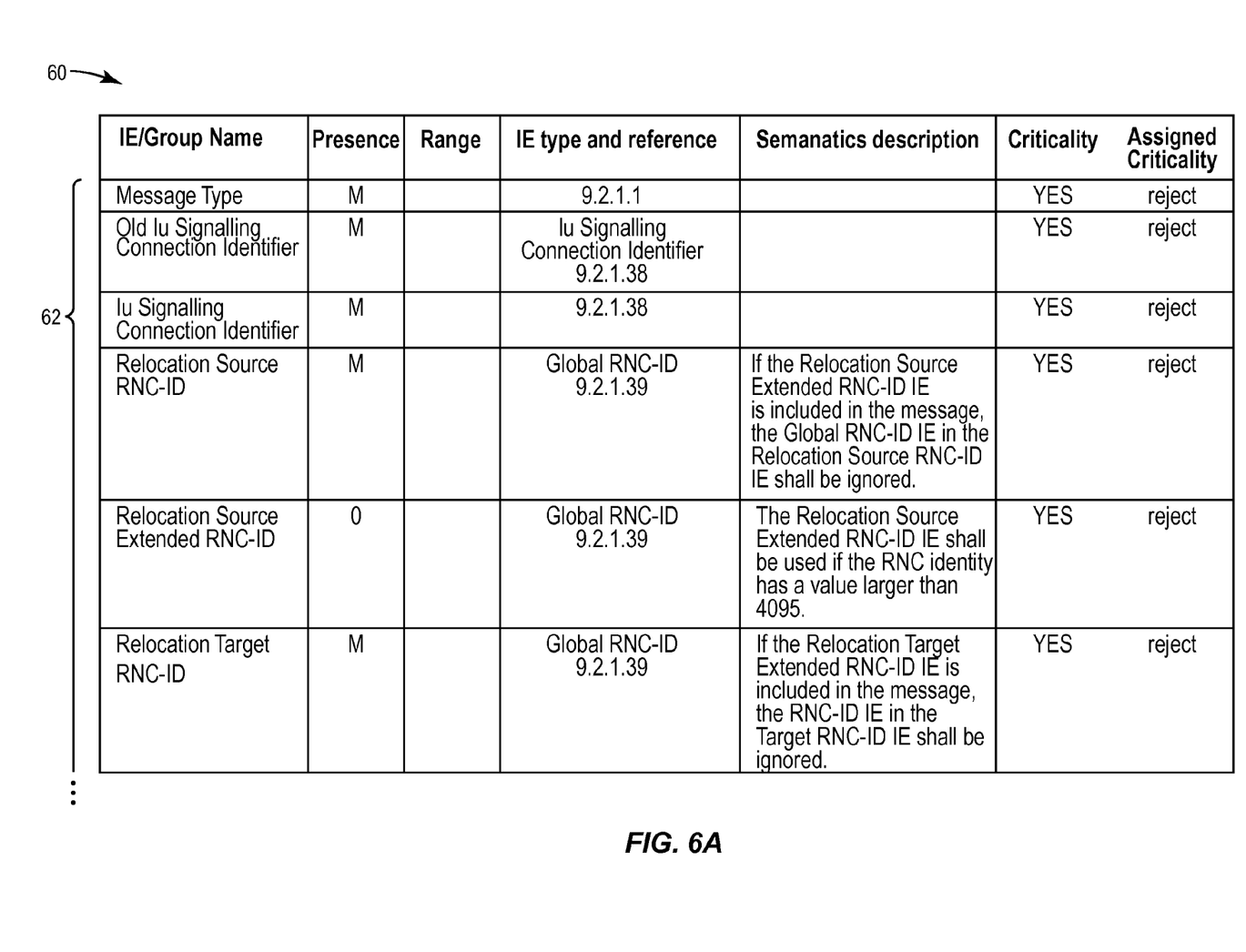
FIG. 6 illustrates an "Enhanced Relocation Complete Request" message of the procedure of FIG. 5.
Figure 6B:
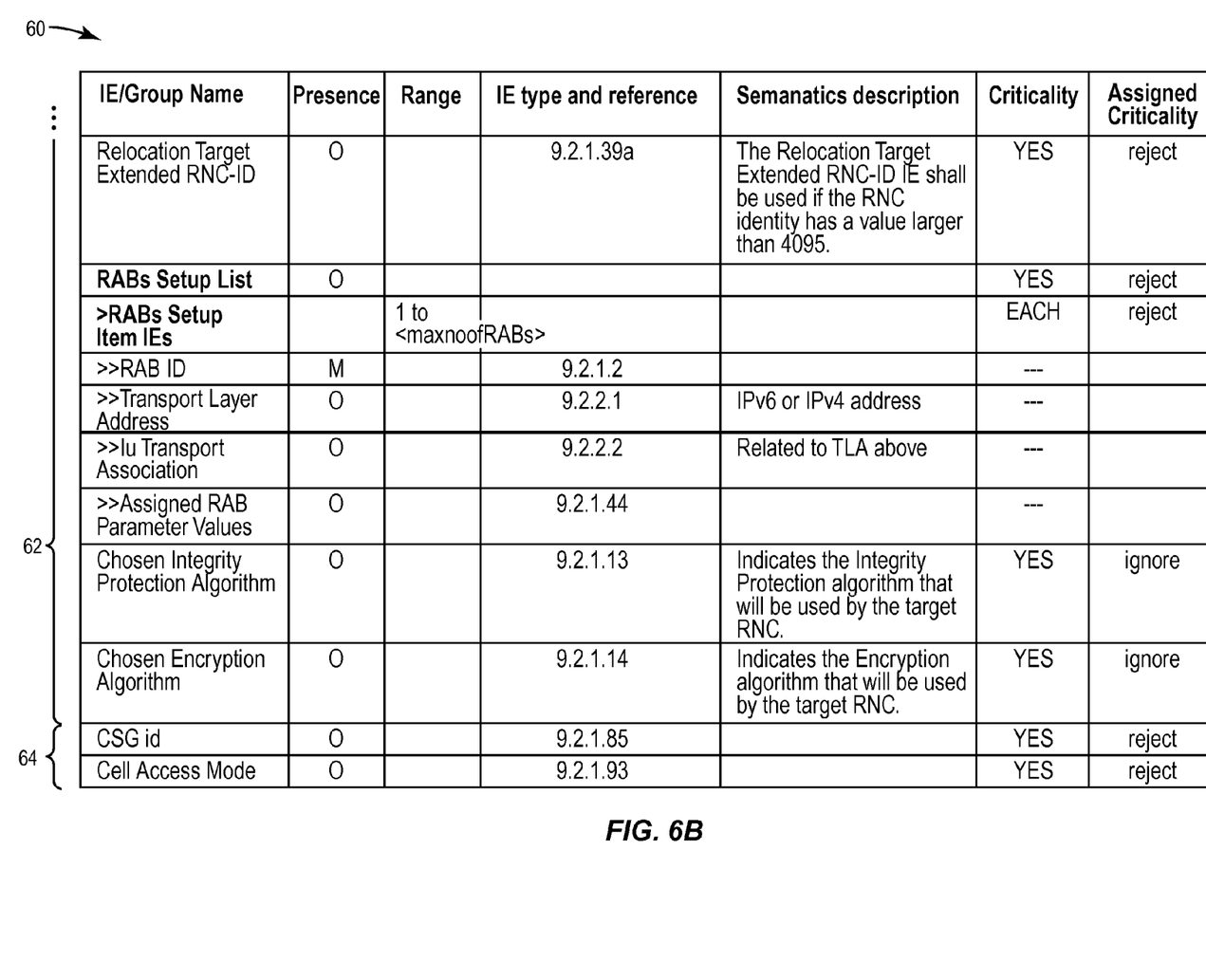

After the execution phase (steps 212 and 214), the HNB GW 24 relays a "RANAP Enhanced Relocation Complete Request" message 60 from the target HNB 16 to the CN 26, as shown at step 216. Notably, this message includes both a CSG identifier (ID) and an information element specifying a cell access mode (alternatively referred to as a "CSG access mode"). FIG. 6 illustrates an example of the message 60 sent in step 216 of the enhanced procedure of FIG. 5. A first portion 62 of the message 60 is sent in both step 112 of procedure 100, as well as in step 216 of procedure 200. A second portion 64 of the message 60, however, is present only in step 216 of procedure 200. As shown in FIG. 6, this second portion 64 includes the CSG ID and cell access mode information elements discussed above.

The CSG ID and cell access mode information elements sent in step 216 of procedure 200 allow the CN 26 to carry out access control, in the event that the HNB 16 is supporting a CSG in closed access mode, or membership verification, in the event that the HNB 16 is supporting a CSG in hybrid access mode. Also, by adding the CSG ID to the message of step 216, the CN 26 is able to apply correct charging in the event that the CSG validation process fails. CSG validation is possible because the CSG ID reported by the UE 20 in the measurement report of step 202 is included in the "RANAP Enhanced Relocation Information Request" of step 206.

Figure 7:
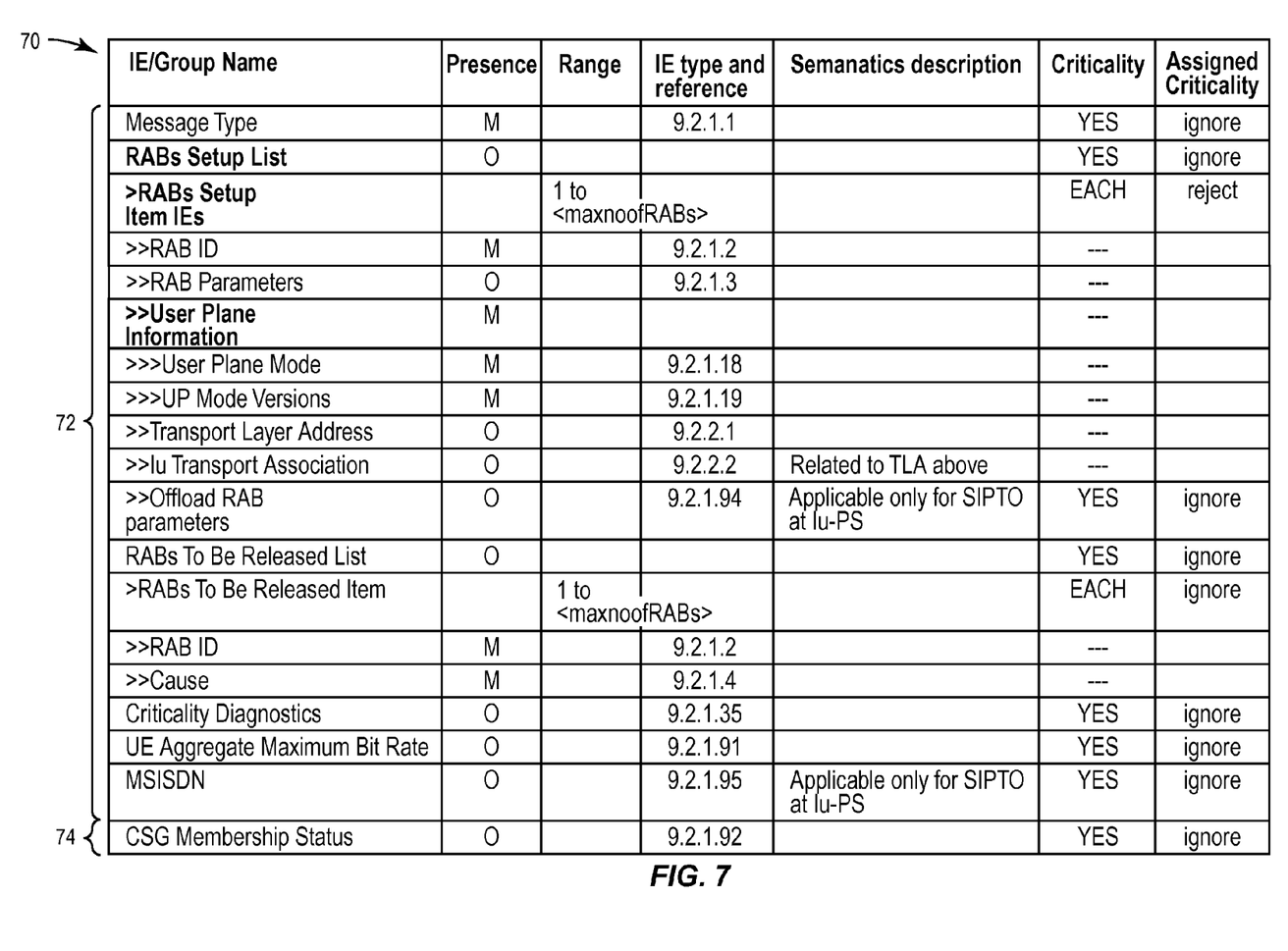
FIG. 7 illustrates an "Enhanced Relocation Complete Response" message of the procedure of FIG. 5.

Once the access control or membership verification is carried out by the CN 26, the CN 26 sends a "RANAP Enhanced Relocation Complete Response" message 70 to the HNB GW 24, which relays the message to the target HNB 16. This is shown in FIG. 5 at step 218. Notably, this message 70 includes a "CSG Membership Status" indication, with which the CN 26 confirms whether the mobile terminal is eligible for inclusion in the CSG of the HNB 16. FIG. 7 illustrates an example of this message 70, which includes a message portion 72 that is sent in both step 114 of procedure 100 and also in step 218 of procedure 200. The message 70 also includes a message portion 74 that is sent only in step 218 of procedure 200. This message portion 74 includes the "CSG Membership Status" information element.

Once the message 70 of step 218, including the "CSG Membership Status" IE, is received at the HNB 16, the HNB 16 can make a decision whether or not to admit the UE 20 to its CSG (in closed mode) or whether or not to prioritize the UE in the CSG (in hybrid mode). If the HNB 16 accepts the handover, the HNB GW 24 relays a "RANAP Enhanced Relocation Complete Confirm" message from the HNB 16 to the CN 26, as shown at step 220, after which the RANAP Iu Release Command and RANAP Iu Release Complete messages are exchanged between the CN 26 and the source RNC 22a, as shown at steps 222 and 224. Optionally, the results of the access control or membership verification performed by the CN 26 (between steps 216 and 218) could be communicated by the CN 26 via the COMMON ID procedure (not shown), after the Enhanced SRNS Relocation Complete procedure 200 has been terminated, instead of as part of the RANAP Enhanced Relocation Complete Response message.

The signaling flow diagram of FIG. 5 and the specific message contents illustrated in FIGS. 6 and 7 provide details of some embodiments of the enhanced techniques for performing a handover between a source RNC in a UTRAN and an HNB connected to the UTRAN. In particular, note that the example message contents illustrated in FIGS. 6 and 7 are adapted from and include additions to message elements described in 3GPP TS 25.413, v. 10.2.0 (June 2011).

Figure 8:
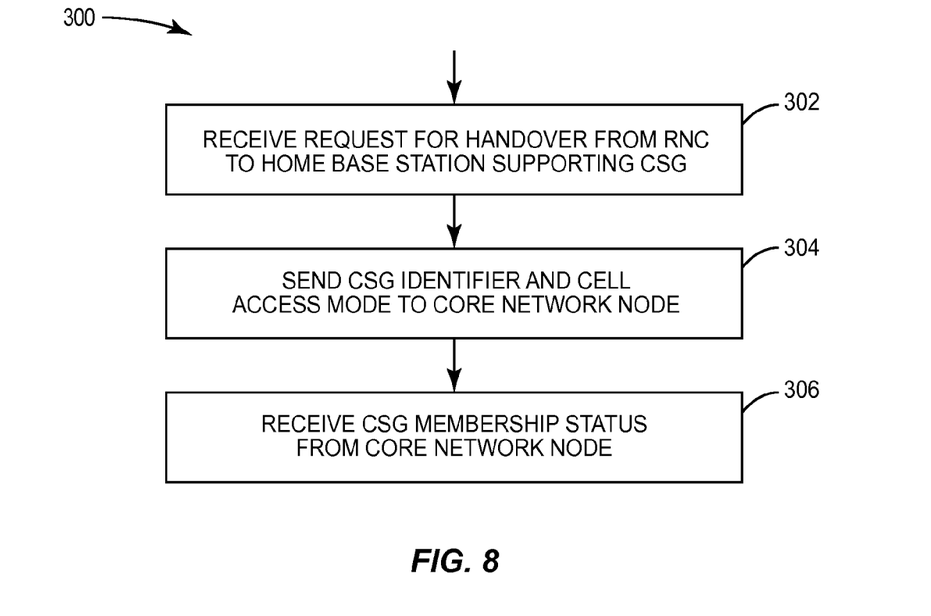
FIG. 8 is a flow chart illustrating a method for performing a handover between a macro RNC and a HNB in the heterogeneous wireless communication network.

FIG. 8 is a process flow diagram illustrating a generalized method 300 for performing a handover between a macro radio network controller and a home base station supporting a CSG in a wireless communication network, as carried out by the home base station.

The method 300 begins with the receiving of a request for handover of the mobile terminal from a radio network controller of the macro wireless network, as shown at block 302. As shown at block 304, a closed subscriber group (CSG) identifier for the home base station and a cell access mode for the home base station are then sent, to a core network node associated with the macro wireless network, for use by the core network node in membership verification or access control for the mobile terminal. In response, the home base station receives a CSG membership status for the mobile terminal from the core network node, as shown at block 306.

In some embodiments of method 300, the home base station is operating in hybrid access mode and the method further includes a determination by the home base station, based upon the CSG membership status received from the core network node, of whether or not to prioritize the mobile terminal in the CSG. In some of these embodiments, the home base station may temporarily admit the mobile terminal to the CSG, prior to receiving the CSG membership status for the mobile terminal from the core network node, based on a reported CSG membership status for the mobile terminal received in the request for handover. In some cases, the reported CSG membership status indicates that the mobile terminal is a member of the CSG but the CSG membership status received from the core network node indicates that the mobile terminal is not a member of the CSG, in which the method may further include de-prioritizing the mobile terminal's access to the home base station in response to receiving the CSG membership status from the core network node.

In other embodiments, the home base station is operating in closed access mode, in which case the method may further include, based upon the CSG membership status received from the core network node, whether or not to admit the mobile terminal to the CSG. In some cases, the home base station may temporarily admit the mobile terminal to the CSG, prior to receiving the CSG membership status for the mobile terminal from the core network node, based on a reported CSG membership status for the mobile terminal received in the request for handover, but then disconnect the mobile terminal from the home base station upon determining that the CSG membership status received from the core network indicates that the mobile terminal is not a member of the CSG.

As was shown in the signaling flow diagram of FIG. 5, in some embodiments the request for handover received from the radio network controller and the CSG membership status received from the core network node are received at the home base station via a home base station gateway. In these embodiments, the closed subscriber group (CSG) identifier and the cell access mode are likewise sent to the core network node via the home base station gateway. As should be clear from the detailed procedures illustrated in FIGS. 5-7, in some embodiments the home base station is a Home NodeB (HNB) connected to a Universal Terrestrial Radio Access Network (UTRAN), and the request for handover is a Radio Network Subsystem Application Part (RNSAP) Enhanced Relocation Request. In some of these embodiments, the CSG ID and the cell access mode are sent to the core network node via a Radio Access Network Application Part (RANAP) Enhanced Relocation Complete Request message and the CSG membership status is received via a RANAP Enhanced Relocation Complete Response message.

Figure 9:
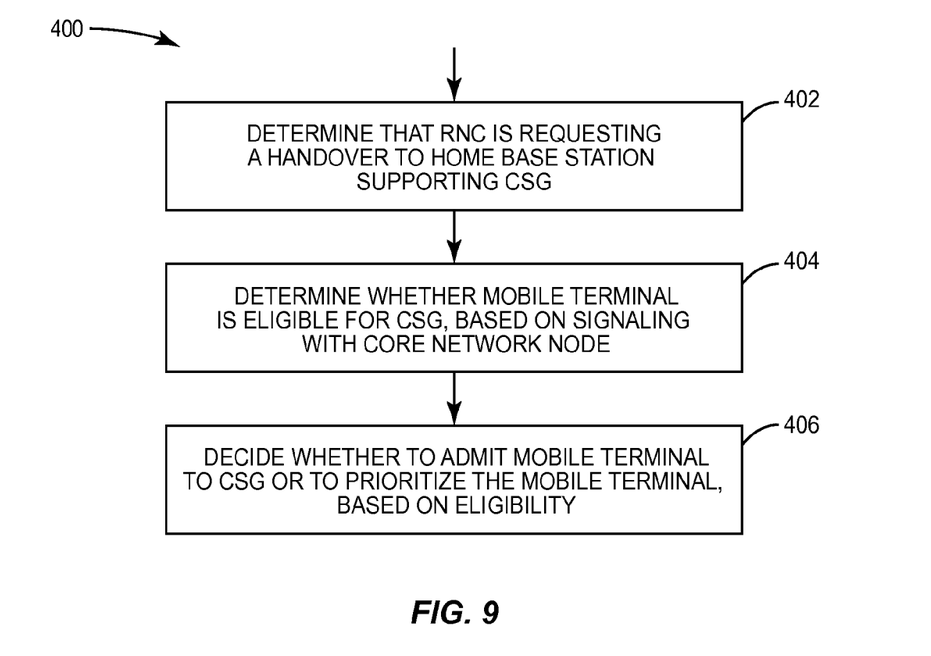
FIG. 9 is another flow chart illustrating a method for performing a handover between a macro RNC and a HNB in the heterogeneous wireless communication network.

FIG. 9 is a process flow diagram illustrating a closely related variant of the method illustrated in FIG. 8, again as implemented by a home base station operating a CSG. The illustrated method 400 begins, as shown at block 402, with determining that a radio network controller in the macro wireless network is requesting a handover of a mobile terminal to the home base station, for inclusion in the CSG. Next, as shown at block 404, the home base station determines, responsive to signaling between the home base station and a core network node associated with the macro wireless network, whether the mobile terminal is eligible for inclusion in the CSG. As shown at block 406, the home base station then decides whether to admit the mobile terminal to the CSG or whether to prioritize the mobile terminal, based on whether the mobile terminal is eligible for inclusion in the CSG.

In some embodiments, the handover of the methods 300 and 400 is a HHO in which existing radio links between the mobile terminal and the serving RNC are removed. The handover eligibility processing performed by the CN 26 (and referenced in blocks 304 and 404) includes access control if the cell access mode is closed, or includes membership verification if the CSG access mode is hybrid.

Referring once again to FIG. 3, it will be appreciated that an HNB 16 configured to support a closed subscriber group (CSG) within the wireless communication network 10 includes one or more transceivers 80 and a controller 82. The one or more transceivers 80 are operative to communicate with a mobile terminal 20 in the wireless communication network 10, and are operative to communicate with the HNB GW 24. The controller 82 is operatively associated with the one or more transceivers 80.

The controller 82 is configured to receive a request for handover of a mobile terminal from a macro RNC 22 to the HNB 16 (see, e.g., step 206 in FIG. 5). In one example, the request is received at the HNB GW 24 via RNSAP signaling between the HNB GW 24 and the macro RNC 22, and is then relayed by the HNB GW 24 to the HNB 16 (see, e.g., step 206 in FIG. 5). The controller 82 is further configured to transmit a CSG identifier and a cell access mode to a core network node 28 of the wireless communication network 10 for handover eligibility processing, with the CSG identifier and cell access mode being transmitted to the core network node 28 via the HNB GW 24 (see, e.g., step. 216). In one example, HNB GW 24 relays the CSG identifier and cell access mode to the core network node 28 using RANAP signaling. The controller 82 is further configured to accept the handover of the mobile terminal 20 from the macro RNC to the HNB responsive to the core network node 28 confirming that the mobile terminal is eligible for inclusion in the CSG (see, e.g., step 220).

The operations illustrated in the signaling flow diagram of FIG. 5 and in the process flow diagrams of FIGS. 8 and 9 may thus be implemented in a home base station using a radio transceiver 80 and controller 82, the latter including appropriate network interface circuitry for carrying out communications with a home base station gateway and/or a core network component. Transceiver 80, of course, includes suitable radio circuitry for receiving and transmitting radio signals formatted in accordance with known formats and protocols, such as the formats and protocols specified by 3GPP for UTRAN.

Figure 10:
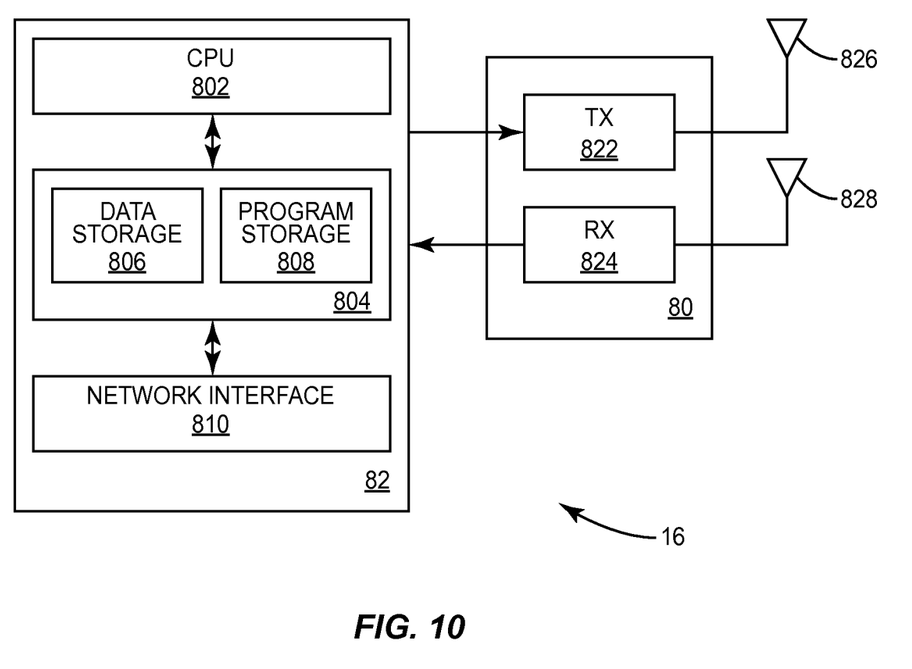
FIG. 10 is a block diagram illustrating components of a home base station according to several embodiments of the invention.

FIG. 10 thus illustrates features of an example home base station 16 according to several embodiments of the present invention. Home base station 16 comprises a transceiver 80 for communicating with mobile terminals as well as a controller 82 for processing the signals transmitted and received by the transceiver 80 and communicating with other elements of the communications network via network interface 810. Transceiver 80 includes a transmitter 822 coupled to one or more transmit antennas 826 and receiver 824 coupled to one or more receive antennas 828. The same antenna(s) 826 and 828 may be used for both transmission and reception. Receiver 824 and transmitter 822 use known radio processing and signal processing components and techniques, typically according to a particular telecommunications standard such as the 3GPP standards for Wideband CDMA (W-CDMA) and High-Speed Packet Access (HSPA). Because the various details and engineering tradeoffs associated with the design and implementation of such circuitry are well known and are unnecessary to a full understanding of the invention, additional details are not shown here.

Controller 82 comprises one or more processors 802, hardware, firmware or a combination thereof, coupled to one or more memory devices 804 that make up a data storage memory 806 and a program storage memory 808. Memory 804 may comprise one or several types of memory such as read-only memory (ROM), random-access memory, cache memory, flash memory devices, optical storage devices, etc.

Controller 82 further comprises a network interface circuit 810, configured to communicate with other network nodes, such as a home base station gateway, again using well known telecommunications standards. Once more, because the various details and engineering tradeoffs associated with the design of baseband processing circuitry for wireless base stations and similar devices are well known and are unnecessary to a full understanding of the invention, additional details are not shown here.

Typical functions of the controller 82 include modulation and coding of transmitted signals and the demodulation and decoding of received signals. In several embodiments of the present invention, controller 82 is further adapted, using suitable program code stored in program storage memory 808, for example, to carry out one of the techniques described above for performing a handover of a mobile terminal from a macro wireless network to the home base station. Of course, it will be appreciated that not all of the steps of these techniques are necessarily performed in a single microprocessor or even in a single module.

In some embodiments, for example, controller 82 is configured to receive a request for handover of the mobile terminal sent to the home base station from a radio network controller of the macro wireless network and to send, to a core network node associated with the macro wireless network, a closed subscriber group (CSG) identifier for the home base station and a cell access mode for the home base station, for use by the core network node in membership verification or access control for the mobile terminal. The controller 82 in these embodiments is further configured to receive a CSG membership status for the mobile terminal from the core network node, responsive to sending the CSG identifier and the cell access mode to the core network node.

All the variations described above for the signaling flow of FIG. 5 and the process flows of FIGS. 8 and 9 may be applied as well to the home base station 16 pictured in FIG. 10. For example, in several embodiments the controller 82 is further configured to, when said home base station is operating in hybrid access mode, determine whether or not to prioritize the mobile terminal in the CSG based upon the CSG membership status received from the core network node. The controller 82 in these embodiments may be further configured to temporarily admit the mobile terminal to the CSG, prior to receiving the CSG membership status for the mobile terminal from the core network node, based on a reported CSG membership status for the mobile terminal received in the request for handover, and may be still further configured to de-prioritize the mobile terminal's access to the home base station in response to receiving the CSG membership status from the core network node, when the reported CSG membership status indicates that the mobile terminal is a member of the CSG and the CSG membership status received from the core network node indicates that the mobile terminal is not a member of the CSG.

In some of these and in other embodiments, the controller 82 is further configured to, when said home base station is operating in closed access mode, determine whether or not to admit the mobile terminal to the CSG based upon the CSG membership status received from the core network node. In some cases, the controller 82 is configured to, when said home base station is operating in closed access mode, temporarily admit the mobile terminal to the CSG, prior to receiving the CSG membership status for the mobile terminal from the core network node, based on a reported CSG membership status for the mobile terminal received in the request for handover, and disconnect the mobile terminal from the home base station upon determining that the CSG membership status received from the core network indicates that the mobile terminal is not a member of the CSG.

Advantageously, the methods and apparatus described above provide an enhanced mechanism for HHO mobility between macro RNCs and hybrid/closed CSG HNBs. The novel methods and apparatus discussed above are based on respecting the principle that a desirable location to perform access control and membership verification is the core network 26, and are further based on the adoption of existing Enhanced SRNS Relocation procedures (see FIG. 3), and extending them to HNB/RNC mobility scenarios.

As a further example of an advantage of the present invention, performance of access control and member verification in the core network 26 ensures that subscriber information is securely handled. Additionally, because the methods 300, 400 and HNB 16 described above reuse portions of existing standardized procedures (e.g. the enhanced SRNS procedure 100 of FIG. 4), these methods and apparatus are backwards compatible with legacy RNCs.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a home base station operating a closed subscriber group (CSG), for performing a handover of a mobile terminal from a macro wireless network to the home base station, the method comprising:
   receiving a request for handover of the mobile terminal from a radio network controller of the macro wireless network;
   sending, to a core network node associated with the macro wireless network, a closed subscriber group (CSG) identifier for the home base station and a cell access mode for the home base station, for use by the core network node in membership verification or access control for the mobile terminal; and
   receiving a CSG membership status for the mobile terminal from the core network node, responsive to sending the CSG identifier and the cell access mode to the core network node;
   wherein said home base station is operating in hybrid access mode and the method further comprises:
   determining, based upon the CSG membership status received from the core network node, whether or not to prioritize the mobile terminal in the CSG; and
   temporarily admitting the mobile terminal to the CSG, prior to receiving the CSG membership status for the mobile terminal from the core network node, based on a reported CSG membership status for the mobile terminal received in the request for handover.

2. The method of claim 1, wherein the reported CSG membership status indicates that the mobile terminal is a member of the CSG and wherein the CSG membership status received from the core network node indicates that the mobile terminal is not a member of the CSG, the method further comprising de-prioritizing the mobile terminal's access to the home base station in response to receiving the CSG membership status from the core network node.

3. The method of claim 1, wherein said request for handover received from the radio network controller and said CSG membership status received from the core network node are received via a home base station gateway, and wherein the closed subscriber group (CSG) identifier and the cell access mode are sent to the core network node via the home base station gateway.

4. The method of claim 1, wherein the home base station is a Home NodeB connected to a Universal Terrestrial Radio Access Network (UTRAN), and wherein said request for handover is a Radio Network Subsystem Application Part (RNSAP) Enhanced Relocation Request.

5. The method of claim 4, wherein the CSG ID and the cell access mode are sent to the core network node via a Radio Access Network Application Part (RANAP) Enhanced Relocation Complete Request message and the CSG membership status is received via a RANAP Enhanced Relocation Complete Response message.

6. A method, in a home base station operating a closed subscriber group (CSG), for performing a handover of a mobile terminal from a macro wireless network to the home base station, the method comprising:
receiving a request for handover of the mobile terminal from a radio network controller of the macro wireless network;
sending, to a core network node associated with the macro wireless network, a closed subscriber group (CSG) identifier for the home base station and a cell access mode for the home base station, for use by the core network node in membership verification or access control for the mobile terminal; and
receiving a CSG membership status for the mobile terminal from the core network node, responsive to sending the CSG identifier and the cell access mode to the core network node;
wherein said home base station is operating in closed access mode, the method further comprising:
temporarily admitting the mobile terminal to the CSG, prior to receiving the CSG membership status for the mobile terminal from the core network node, based on a reported CSG membership status for the mobile terminal received in the request for handover; and
disconnecting the mobile terminal from the home base station upon determining that the CSG membership status received from the core network indicates that the mobile terminal is not a member of the CSG.

7. A home base station configured to support a closed subscriber group within a macro wireless network, the home base station comprising:
a transceiver operative to communicate with a mobile terminal, and
a controller configured to:
receive a request for handover of the mobile terminal sent to the home base station from a radio network controller of the macro wireless network;
send, to a core network node associated with the macro wireless network, a closed subscriber group (CSG) identifier for the home base station and a cell access mode for the home base station, for use by the core network node in membership verification or access control for the mobile terminal; and
receive a CSG membership status for the mobile terminal from the core network node, responsive to sending the CSG identifier and the cell access mode to the core network node;
wherein the controller is further configured to, when said home base station is operating in hybrid access mode, determine whether or not to prioritize the mobile terminal in the CSG based upon the CSG membership status received from the core network node, and to temporarily admit the mobile terminal to the CSG, prior to receiving the CSG membership status for the mobile terminal from the core network node, based on a reported CSG membership status for the mobile terminal received in the request for handover.

8. The home base station of claim 7, wherein the controller is further configured to de-prioritize the mobile terminal's access to the home base station in response to receiving the CSG membership status from the core network node, when the reported CSG membership status indicates that the mobile terminal is a member of the CSG and the CSG membership status received from the core network node indicates that the mobile terminal is not a member of the CSG.

9. The home base station of claim 7, wherein the controller is further configured to, when said home base station is operating in closed access mode, determine whether or not to admit the mobile terminal to the CSG based upon the CSG membership status received from the core network node.

10. The home base station of claim 7, wherein the home base station is configured to receive said request for handover and said CSG membership status via a home base station gateway and to send the closed subscriber group (CSG) identifier and the cell access mode to the core network node via the home base station gateway.

11. The home base station of claim 7, wherein the home base station is a Home NodeB connected to a Universal Terrestrial Radio Access Network (UTRAN), and wherein said request for handover is a Radio Network Subsystem Application Part (RNSAP) Enhanced Relocation Request.

12. The home base station of claim 11, wherein the home base station is configured to send the CSG ID and the cell access mode to the core network node via a Radio Access Network Application Part message.

13. A home base station configured to support a closed subscriber group within a macro wireless network, the home base station comprising:
a transceiver operative to communicate with a mobile terminal, and
a controller configured to:
receive a request for handover of the mobile terminal sent to the home base station from a radio network controller of the macro wireless network;
send, to a core network node associated with the macro wireless network, a closed subscriber group (CSG) identifier for the home base station and a cell access mode for the home base station, for use by the core network node in membership verification or access control for the mobile terminal; and
receive a CSG membership status for the mobile terminal from the core network node, responsive to sending the CSG identifier and the cell access mode to the core network node;
wherein the controller is further configured to, when said home base station is operating in closed access mode:
temporarily admit the mobile terminal to the CSG, prior to receiving the CSG membership status for the mobile terminal from the core network node, based on a reported CSG membership status for the mobile terminal received in the request for handover; and disconnect the mobile terminal from the home base station upon determining that the CSG membership status received from the core network indicates that the mobile terminal is not a member of the CSG.

* * * * *